(12) United States Patent
Speggiorin

(10) Patent No.: US 6,824,319 B1
(45) Date of Patent: Nov. 30, 2004

(54) TRIPOD PARTICULARLY FOR OPTICAL AND PHOTOGRAPHIC USE

(75) Inventor: Paolo Speggiorin, Mussolente (IT)

(73) Assignee: Lino Manfrotto + Co. S.p.A., Bassano del Grappa (IT)

( * ) Notice: Subject to any disclaimer, the term of this patent is extended or adjusted under 35 U.S.C. 154(b) by 0 days.

(21) Appl. No.: 10/148,729

(22) PCT Filed: May 9, 2000

(86) PCT No.: PCT/EP00/04129

§ 371 (c)(1),
(2), (4) Date: Oct. 3, 2002

(87) PCT Pub. No.: WO01/42706

PCT Pub. Date: Jun. 14, 2001

(30) Foreign Application Priority Data

Dec. 6, 1999 (IT) .......................... PD99A0279

(51) Int. Cl.[7] .............................................. G03B 17/00
(52) U.S. Cl. ...................................... 396/428; 248/168
(58) Field of Search ................................ 396/419, 428; 248/166–171

(56) References Cited

U.S. PATENT DOCUMENTS

| | | | |
|---|---|---|---|
| 2,956,764 A | * | 10/1960 | Koma .......................... 396/428 |
| 4,614,452 A | | 9/1986 | Wang |
| 4,747,569 A | | 5/1988 | Hoshino |
| 5,505,415 A | * | 4/1996 | Brett .......................... 248/168 |
| 5,865,406 A | * | 2/1999 | Teeple .......................... 396/419 |
| 6,164,843 A | | 12/2000 | Battocchio |

FOREIGN PATENT DOCUMENTS

| | | |
|---|---|---|
| EP | 0 050 079 | 4/1982 |
| EP | 0 952 383 | 10/1999 |
| FR | 1 432 624 | 6/1966 |
| GB | 905 332 | 9/1962 |
| IT | PD98A000096 | 4/1998 |

* cited by examiner

Primary Examiner—David M. Gray
(74) Attorney, Agent, or Firm—RatnerPrestia

(57) ABSTRACT

A tripod particularly for use in optical and photographic applications. The tripod includes a spider having a main axis, at least three legs converging in the spider and articulated upon the spider, and a support in the spider for supporting a column. Provided in the support are components for placing the column and for removably locking the column in at least two positions in which the axis of the column is angularly inclined with respect to the main axis of the spider.

18 Claims, 3 Drawing Sheets

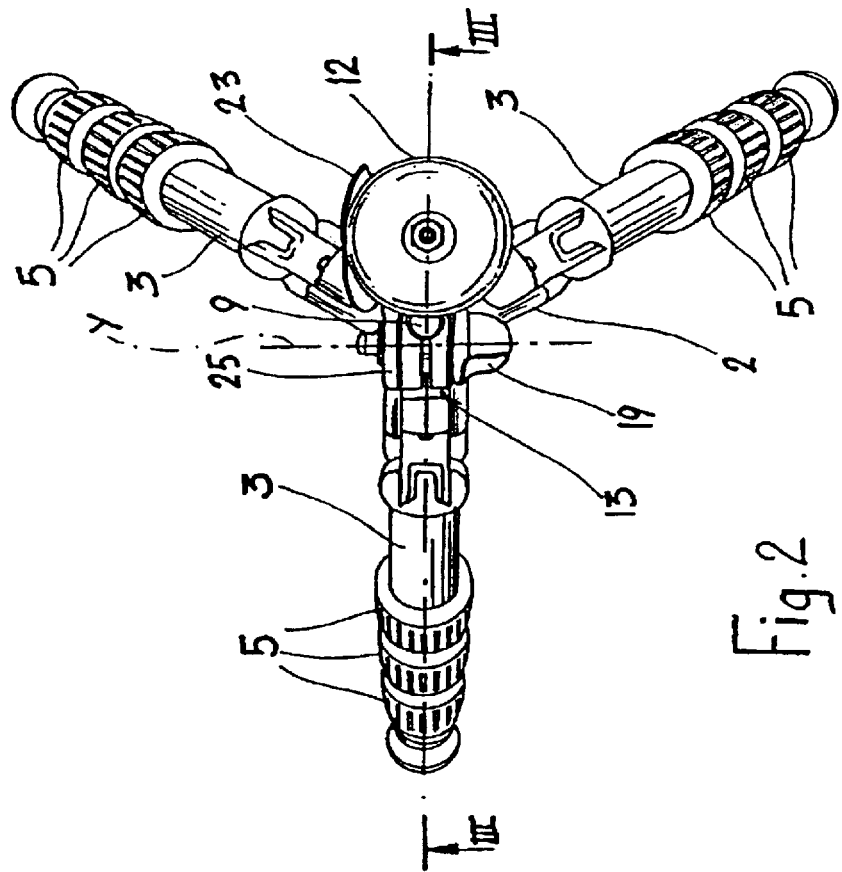
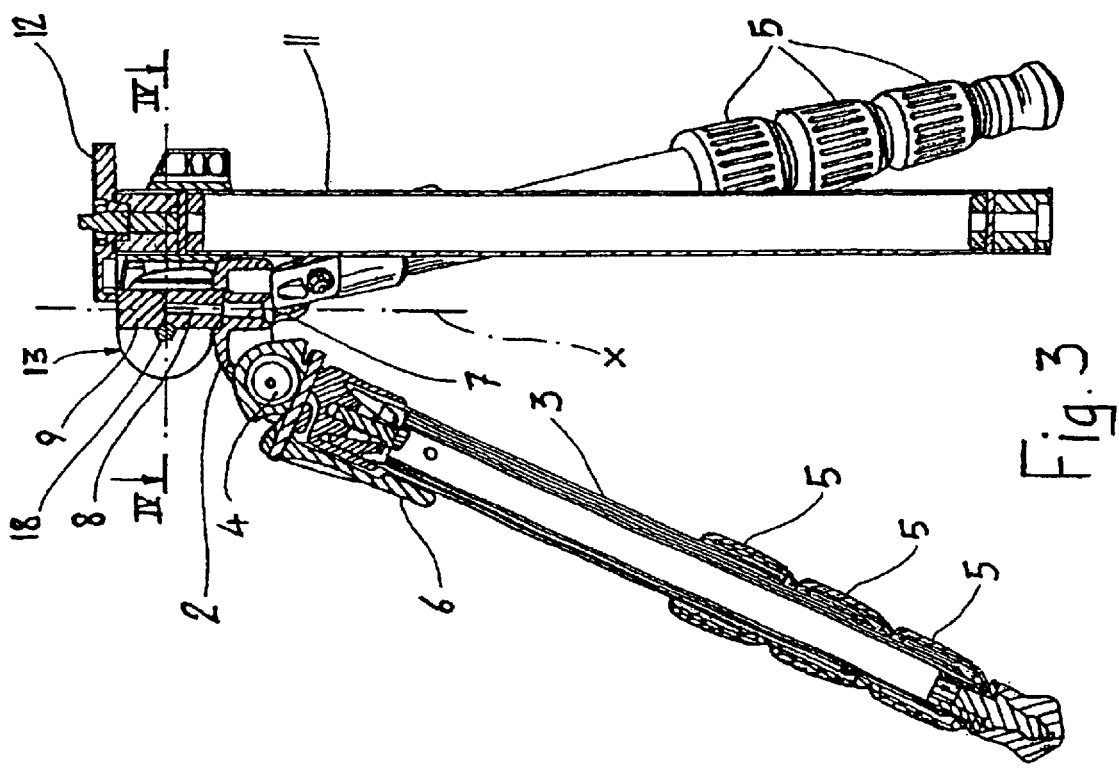

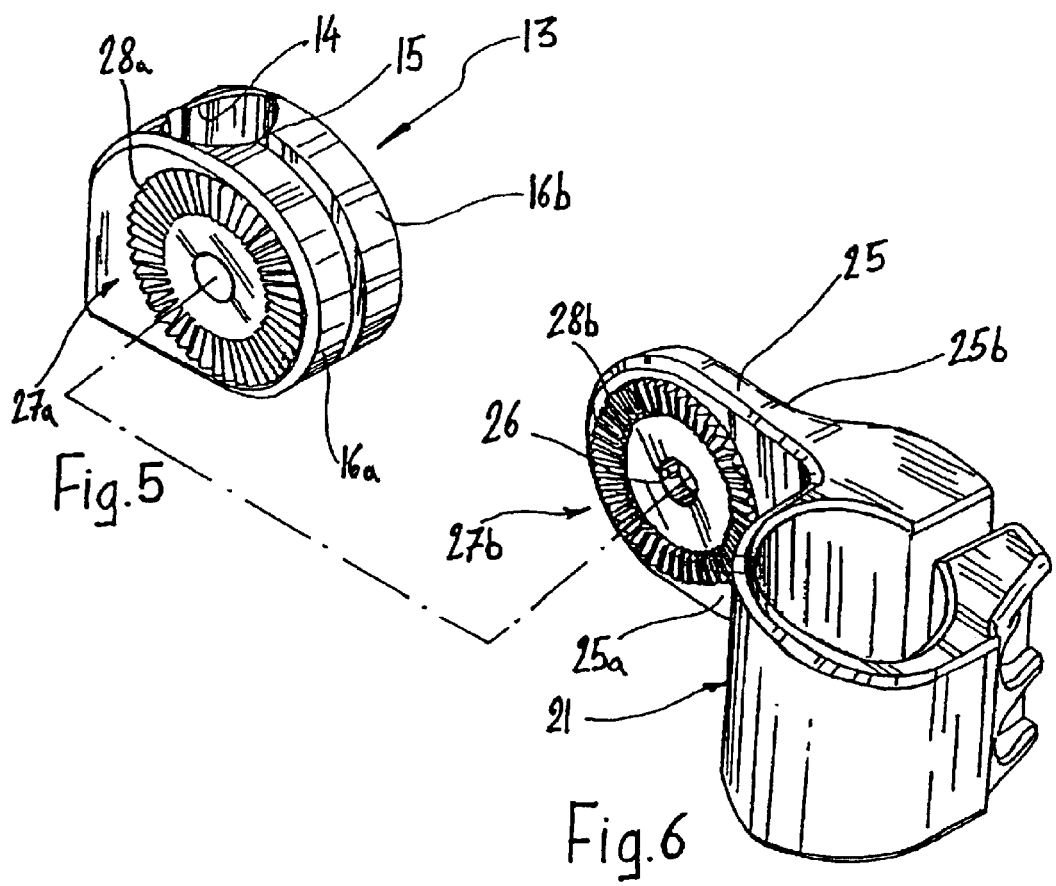
Fig.5
Fig.6
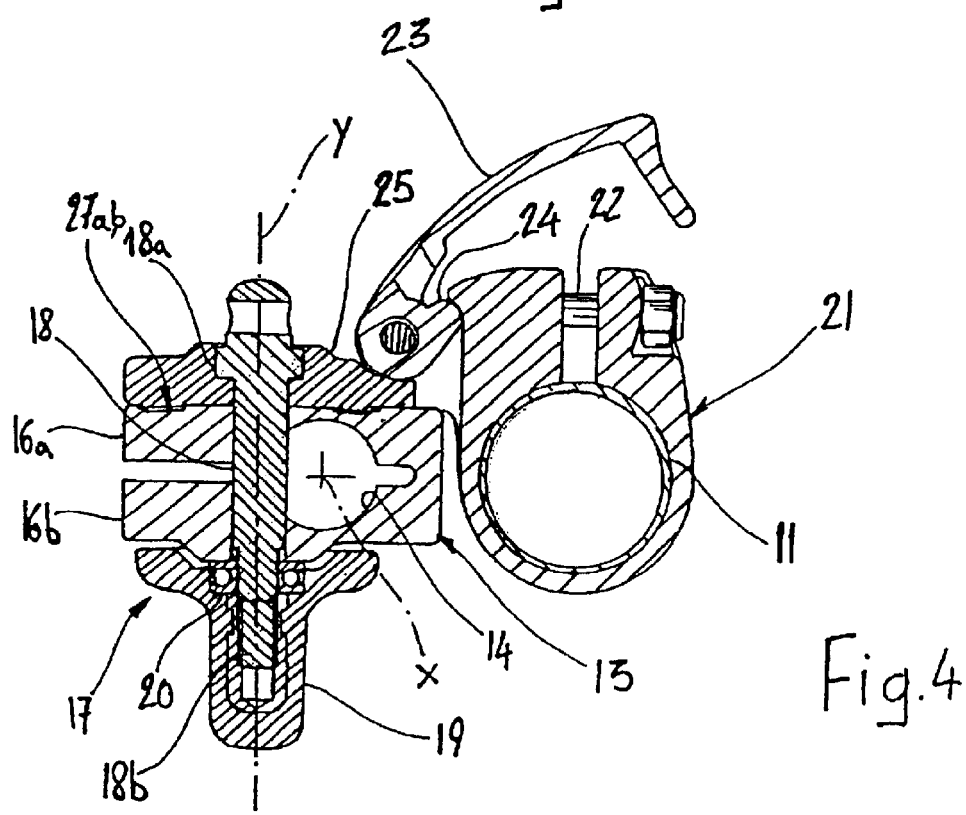
Fig.4

TRIPOD PARTICULARLY FOR OPTICAL AND PHOTOGRAPHIC USE

This application is a U.S. national-phase application of PCT International Application No. PCT/EP00/04129 filed May 9, 2000.

TECHNICAL FIELD

The present invention relates to an improved tripod, in particular for optical or photographic use.

In the following context, the term "tripod" is meant to indicate supports with three or more legs and therefore no limitation is to be considered implicitly or explicitly attributable to the terminology employed with regard to the number of legs.

BACKGROUND ART

It is well known that tripods of the type indicated are used for supporting optical or photographic equipment in a stable manner at a predetermined distance and height with respect to the subject viewed or photographed.

A support of this type is known from the description of Patent Application No. PD98A000096 of the same Applicant. This describes a tripod comprising a spider for articulation of the legs and a support mounted in the spider with a first seating coaxial with the main axis of the tripod, and a second seating with an axis substantially perpendicular to the first seating so that the column of the tripod can be received alternatively and removably in the first and second seating.

In the case of photographic close-up shots or macrophotographs, in which it is necessary to get very close to the subject to be photographed, this tripod allows placements of the column, and consequently of the photographic equipment, very close up, in so far as the column can be mounted at right-angles with respect to the main axis of the tripod, yet said placements are limited to only two directions, perpendicular to each other, obtainable by mounting the column in one or other of the seatings provided on the spider.

DISCLOSURE OF THE INVENTION

The invention proposes as its principal aim that of improving the versatility of the tripods of known type by increasing the number of positions and placements allowed for the column.

Within the scope of said aim, the invention likewise proposes to allow the adjustment of the position of the column easily and independently of the adjustment of the position of the legs of the tripod.

These and other aims are achieved by a tripod produced in accordance with the present invention.

BRIEF DESCRIPTION OF DRAWINGS

The characteristics and advantages of the invention will become clear from the following detailed description of one of its preferred exemplary embodiments illustrated by way of non-limiting example with reference to the following drawings, in which:

FIG. 2 is a plan view of the tripod in FIG. 1, FIG. 3 is a view in section along the line III—III in FIG. 2, FIG. 4 is a view in partial section along the line IV—IV in FIG. 3, and FIGS. 5 and 6 are perspective views of two details of FIG. 4.

BEST MODE OF CARRYING OUT THE INVENTION

Figure 1:
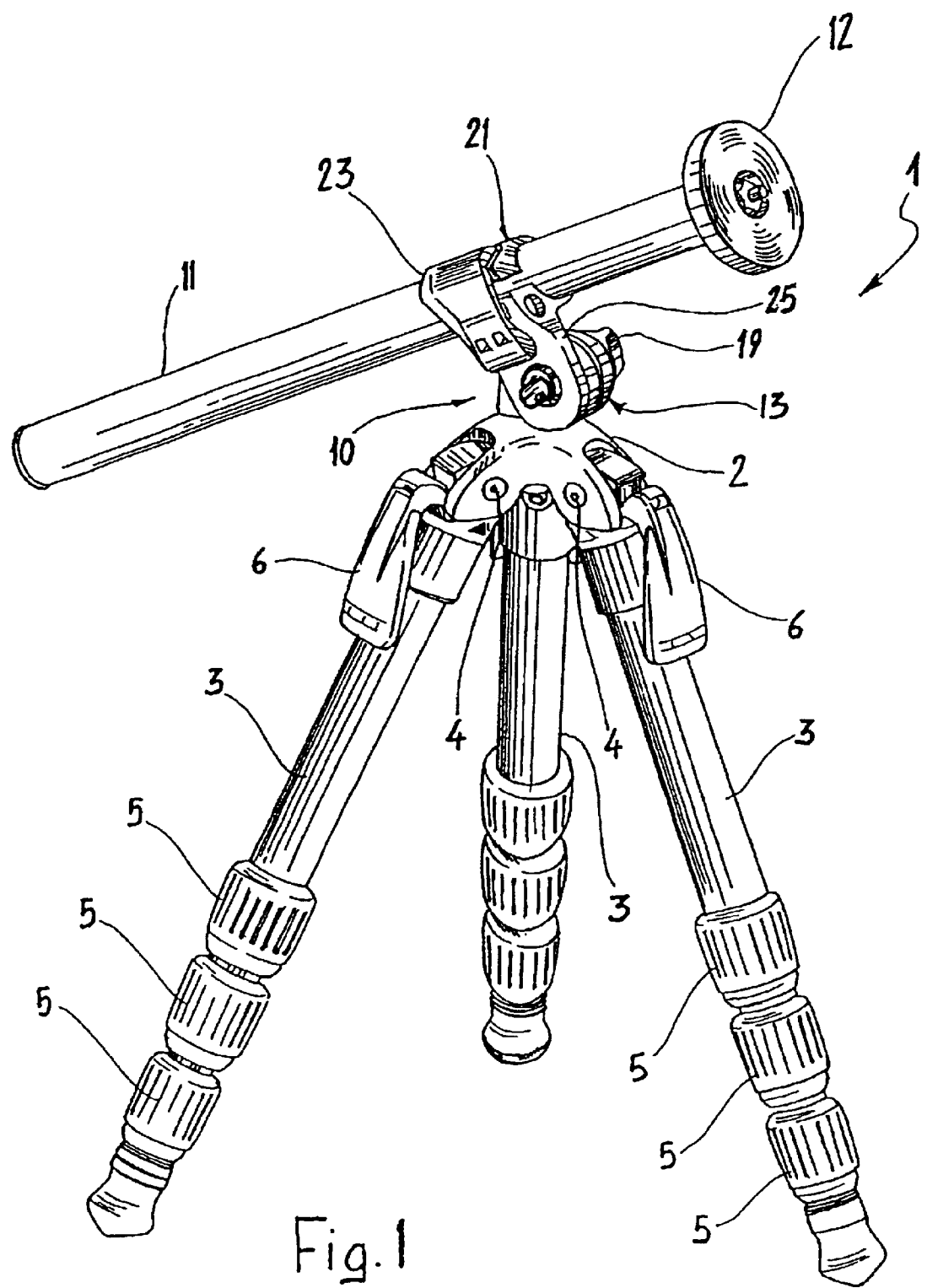
FIG. 1 is a perspective view of a tripod produced according to the present invention.

With reference to FIGS. 1 to 3, the reference 1 indicates as a whole a tripod produced in accordance with the present invention and including a spider 2 having a main axis X in which there converge and are articulated three legs all indicated by 3, articulated on respective pins 4.

Each leg is produced with a telescopic structure having two or more extensions, the relative positioning of which is adjustable by means of clamps 5. The angular position of each leg 3 about the corresponding pin 4 is further adjustable by means of a lever adjusting device 6 of a type which is conventional per se.

Centrally in the spider there is provided a hole 7 extending coaxially with the axis X and capable of receiving a screw means 8 for locking a cylindrical pin 9 which is also coaxial with the axis X. On the pin 9 there is mounted rotatably about the axis X a support indicated as a whole by 10.

The support 10 comprises a first and a second part respectively rigidly connectable to the spider 2 and to a column 11, the latter being provided at one end with a connection 12, for example a screw connection, for attaching an item of photographic equipment or other equipment thereto.

More particularly, the first part comprises a clamping member 13 in which is defined a cylindrical seating 14 coaxial with the axis X and intended to receive the pin 9. The seating 14 is interrupted circumferentially by a notch 15 at which there extend, towards the outside, two juxtaposed cheeks 16a,b. By means of the notch 15 the member 13 is elastically deformable and in particular is radially contractile transversely to the axis X.

The member 13 is clamped on the pin 9, so that it is rigidly connected to the latter by means of a screw clamping device indicated as a whole by 17. Said device comprises a pin arrangement 18 disposed along axis Y perpendicular to the main axis X, passing through the cheeks 16a,b, and having a head 18a and an opposed screw-threaded portion 18b screwed into an operating knob 19.

The reference 20 indicates a bearing, preferably of the rolling ball type, interposed between the knob 19 and the member 13, which serves to reduce the forces required by the user when actuating the knob 19.

The second part of the support 10 comprises a split sleeve arrangement 21 which is slipped onto the column 11. The column 11 is rotatably and slidably received in the sleeve arrangement 21 and is clamped on the latter by means of a tie-rod 22, mounted on the sleeve and connected by one of its axial ends to a lever 23. Said lever 23 is provided with a protuberance 24 interfering with the sleeve arrangement 21 to clamp the latter against the column 11 as a result of closing actuation of the lever on the sleeve itself.

From the sleeve arrangement 21 there extends an appendage 25 defined by opposed surfaces 25a,b and traversed centrally by a hole 26 by means of which the sleeve arrangement 21 is supported rotatably on the pin 18.

Between the appendage 25 and the cheek 16a facing the latter there acts a coupling with frontal teeth including a first and a second coupling member 27a,b that can be mutually coupled in the direction of the axis Y. The coupling members 27a,b comprise respective toothed crowns 28a,b extending coaxially with the axis Y, projecting respectively from the surface 25a of the appendage 25 and from the surface of the clamping member 13 facing the latter.

The toothed portions 28a,b are shaped with a profile such as to block the relative rotation between the first and the second part of the support, about the axis Y, when the coupling members 27a,b are mutually coupled.

The coupling members 27a,b are axially clamped against each other by the screwing of the knob 19 on the screw-threaded portion of the pin 18. The toothed crowns 28a,b are further capable of being axially coupled with a preselected angular positioning with respect to each other about the axis Y, and consequently the sleeve arrangement 21, and therefore the column 11 can be oriented and locked with respect to the support 10 in a preselected operating position in which the column 11 is inclined with respect to the main axis X by a preselected angulation. The number of relative angular positions between the column 11 and the spider 2 is determined by the number and the angular pitch of the teeth of the crowns 28a,b.

It should likewise be noted that by means of the clamping of the knob 19 on the pin 18 both the blocking of the member 13 against rotation about the axis X and also the blocking of the sleeve arrangement 21 relative to rotation about the axis Y are obtained. Starting from a preselected placement of the column 11, in which rotation of the support 10 about the axes X and Y is blocked, unscrewing the knob 19 makes it possible to uncouple axially the coupling members 27a,b. In said operating condition the column 11 can be freely oriented about the axis Y in order to be placed, if required, with a different inclination with respect to the main axis X.

Unscrewing of the knob 19, also effects the unblocking of the support with regard to rotation about the main axis X of the spider.

The invention thus achieves the aims proposed by obtaining numerous advantages with respect to the known solutions. Firstly, with the tripod according to the present invention a greater versatility is obtained in the placement of the column with respect to the spider, with an increase in the number of positions, comprised and capable of being selected between two opposed operating positions in which the column is respectively disposed parallel and perpendicular to the main axis of the spider. Secondly, the invention advantageously makes it possible to obtain easy and rapid adjustment of the positioning of the column in addition to the fact that said adjustment is independent of the adjustment of the position of the legs of the tripod. This allows the user to act with greater rapidity and security in the placement of items of photographic equipment, which are often rather heavy, even in the case of photographic shots which are not particularly convenient or easy.

What is claimed is:

1. A tripod comprising:
   a spider having a main axis;
   at least three legs converging in said spider and articulated thereon;
   a column having an axis;
   a support in said spider supporting said column, said support including means for placing the column and means for removably locking said column in at least two positions in which the axis of the column is angularly inclined with respect to the main axis of the spider, said support mounted rotatable in said spider about said main axis, and
   disposed between said support and said spider, means for blocking the rotation of the support about said main axis, and said means for placing the column is incorporated in said means for blocking the rotation of said support.

2. The tripod according to claim 1, wherein said support comprises a first part and a second part respectively rigidly connectable to the spider and to the column, and said placement means comprises a coupling which acts between said first part and second part.

3. The tripod according to claim 2, wherein the coupling can be selectively uncoupled.

4. The tripod according to claim 2, wherein the coupling comprises first and second members coaxial with each other in a direction substantially perpendicular to the main axis of the spider.

5. The tripod according to claim 4, wherein said first and second coupling members include, respectively, a first and a second toothed portion and are provided respectively on the first and on the second part of the support, said toothed portions constituting means for blocking the relative rotation of said first and second parts of the support.

6. The tripod according to claim 5, wherein said first part of the support comprises a clamping member lockable relative to the spider about said main axis, said first toothed portion being formed on a surface of said clamping member, and said second part of the support comprises a sleeve arrangement with an extending appendage for the removable locking of the column, said second toothed portion being formed on the appendage extending from said sleeve arrangement.

7. The tripod according to claim 6, wherein said locking means comprises a screw clamping device acting between said appendage and said clamping member in order to lock, in reciprocal coupling, said first and second toothed portions in a preselected angular position of the column with respect to the main axis of the spider.

8. A tripod comprising:
   a spider having a main axis;
   at least three legs converging in the spider and articulated on the spider;
   a column having an axis;
   a support mounted rotatably in the spider about the main axis and supporting the column, the support including:
      (a) a first and a second part respectively rigidly connectable to the spider and to the column,
      (b) a coupling acting between the first and second parts for placing the column, and
      (c) means for removably locking the column in at least two positions in which the axis of the column is angularly inclined with respect to the main axis of the spider; and
   means for blocking the rotation of the support about the main axis, the blocking means disposed between the support and the spider.

9. The tripod according to claim 8, wherein the means for placing the column is incorporated in the means for blocking the rotation of the support.

10. The tripod according to claim 8, wherein the coupling can be selectively uncoupled.

11. The tripod according to claim 8, wherein the coupling comprises first and second members coaxial with each other in a direction substantially perpendicular to the main axis of the spider.

12. The tripod according to claim 11, wherein the first and second coupling members include, respectively, a first and a second toothed portion and are provided respectively on the first and on the second part of the support, the toothed portions constituting the means for blocking the relative rotation of the first and second parts of the support.

13. The tripod according to claim 12, wherein the first part of the support comprises a clamping member lockable relative to the spider about the main axis, the first toothed portion being formed on a surface of the clamping member, and the second part of the support comprises a sleeve arrangement with an extending appendage for the removable locking of the column, the second toothed portion being formed on the appendage extending from the sleeve arrangement.

14. The tripod according to claim 13, wherein the locking means comprises a screw clamping device acting between the appendage and the clamping member in order to lock, in reciprocal coupling, the first and second toothed portions in a preselected angular position of the column with respect to the main axis of the spider.

15. A tripod comprising:

a spider having a main axis;

at least three legs converging in the spider and articulated on the spider;

a column having an axis; and a support mounted rotatably in the spider about the main axis and supporting the column, the support including:
 (a) a clamping member rigidly connectable to and lockable relative to the spider about the main axis, the clamping member having a first toothed portion on its surface,
 (b) a sleeve arrangement rigidly connectable to the column for the removable locking of the column and having an extending appendage with a second toothed portion formed on the appendage,
 (c) a coupling acting between the clamping member and the sleeve arrangement for placing the column and comprising first and second members coaxial with each other in a direction substantially perpendicular to the main axis of the spider, the first and second coupling members including, respectively, a first and a second toothed portion and being provided respectively on the clamping member and on the sleeve arrangement of the support, the toothed portions selectively blocking the rotation of the support about the main axis, and
 (d) a screw clamping device acting between the appendage and the clamping member in order to removably lock, in reciprocal coupling, the first and second toothed portions in at least two preselected positions in which the axis of the column is angularly inclined with respect to the main axis of the spider.

16. The tripod according to claim 15, wherein the means for placing the column is incorporated in the means for blocking the rotation of the support.

17. The tripod according to claim 15, wherein the coupling can be selectively uncoupled.

18. A tripod comprising:

a spider having a main axis;

at least three legs converging in said spider and articulated thereon;

a column having an axis;

a support in said spider supporting said column, said support including means for placing the column and means for removably locking said column in at least two positions in which the axis of the column is angularly inclined with respect to the main axis of the spider, said support mounted rotatably in said spider about said main axis, and disposed between said support and said spider, means for blocking the rotation of the support about said main axis, said support comprises first and second parts respectively rigidly connectable to the spider and to the column, and said placement means comprises a coupling which acts between said first and second parts, the coupling includes first and second members coaxial with each other in a direction substantially perpendicular to the main axis of the spider, and said first and second coupling members include, respectively, a first and second toothed portion and are provided respectively on the first and on the second part of the said support, said toothed portions constituting means for blocking the relative rotation of said first and second parts of the support.

* * * * *